UNITED STATES PATENT OFFICE.

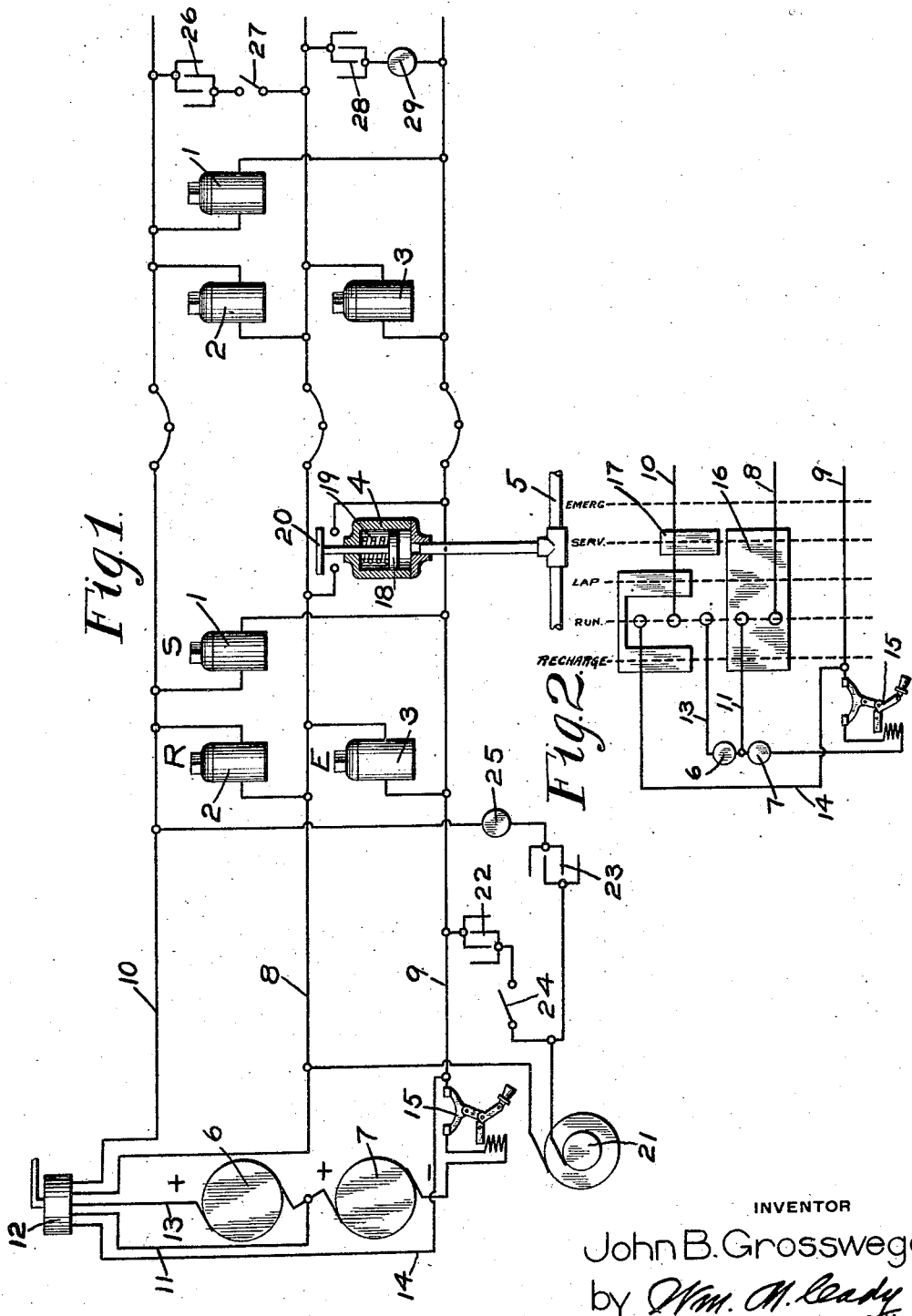

JOHN B. GROSSWEGE, OF WILKINSBURG, PENNSYLVANIA, ASSIGNOR TO THE WESTINGHOUSE AIR BRAKE COMPANY, OF WILMERDING, PENNSYLVANNIA, A CORPORATION OF PENNSYLVANIA.

ELECTROPNEUMATIC BRAKE AND SIGNAL SYSTEM.

1,414,736.   Specification of Letters Patent.   Patented May 2, 1922.

Application filed May 22, 1919. Serial No. 298,975.

*To all whom it may concern:*

Be it known that I, JOHN B. GROSSWEGE, a citizen of the United States, residing at Wilkinsburg, in the county of Allegheny and State of Pennsylvania, have invented new and useful Improvements in Electropneumatic Brakes and Signal Systems; of which the following is a specification.

This invention relates to electrically controlled brakes for railway trains, and has for one of its objects to reduce the number of train wires required for controlling the application and release of the brakes.

Another object of my invention is to provide a system in which the electric brake circuits may be utilized for train signalling.

In the accompanying drawing; Fig. 1 is a diagrammatic drawing of an electro-pneumatic brake equipment for a train and embodying my invention; and Fig. 2 a diagram showing the different positions of the brake controller.

As shown in Fig. 1 of the drawing, each car is provided with a service magnet 1 for controlling the admission of fluid under pressure to the brake cylinder in a service application of the brakes, a release magnet 2 for controlling the release of fluid from the brake cylinder, an emergency magnet 3 for controlling the admission of fluid to the brake cylinder in an emergency application of the brakes, and an emergency switch device 4 adapted to be operated upon a sudden reduction in pressure in the usual automatic brake pipe 5 for short-circuiting the emergency circuit.

On the head car or locomotive there is provided a double voltage electric generator, such as a three wire generator or a generator in which the armature has two windings. In the drawing, I have shown the last-mentioned type of generator, having a commutator 6 for one winding and a commutator 7 for the other winding, the positive brush of the commutator 7 and the negative brush of the commutator 6 being connected to a wire 11 leading to an electric controller 12, the positive terminal of commutator 6 and the negative terminal of commutator 7 being connected by the respective wires 13 and 14 to said controller.

The release magnets 2 are connected across the train wires 8 and 10, the service magnets 1 across the train wires 9 and 10, and the emergency magnets 3 and the emergency switches 4 across the train wires 8 and 9.

An emergency circuit breaker 15 is connected in the train wire 9 adjacent to the generator for opening the emergency circuit when the current flow becomes excessive, through the operation of the emergency switch 4 to short-circuit the train wires 8 and 9.

The emergency magnets 3 are normally energized and are adapted upon deenergization to effect an emergency application of the brakes.

The release magnets 2 are adapted to release the brakes when deenergized if the triple or equalizing valve device is in release position and the service application magnets 1 are adapted to apply the brakes when energized.

The magnets E, R, and S may control apparatus similar to that disclosed in Patent No. 1,192,961 of Walter V. Turner, dated August 1, 1916, except that the emergency magnet of the patent construction is normally deenergized and is energized to effect an emergency application of the brakes, while in the present construction the emergency magnet is normally energized and is deenergized to effect an emergency application of the brakes.

According to the patent construction, when the service magnet is energized, fluid is vented from the brake pipe of a fluid pressure brake system so as to operate a triple or equalizing valve device to effect a service application of the brakes and when the emergency magnet is operated, fluid is vented from the brake pipe at an emergency rate to effect the movement of the triple valve device to emergency position.

It will therefore be seen that in either brake application position, the exhaust from the brake cylinder through the release magnet is cut off by the movement of the triple valve parts, so that it is immaterial whether the release magnet is open or closed.

In operation, the brake controller 12 is normally maintained in running position, in which, as shown in Fig. 2 of the drawing, the wire 11 is connected to train wire 8 through contact 16 of the controller. The train wires 8 and 9 are therefore connected together through the winding of the generator controlled by the commutator 7 and the emergency magnets 3 are held energized, by the current generated in this winding.

If it is desired to effect a service application of the brakes, the brake controller 12 is turned to service position, in which the train wire 10 is connected through contact 17 with wire 13 and the wire 11 through contact 16 with train wire 8.

A circuit is therefore closed through both windings of the generator controlled by the commutators 6 and 7, so that the service magnets 1, connected across the train wires 9 and 10, are energized by the combined voltage of the two windings.

The service magnets are then energized to effect a service application of the brakes.

The emergency magnets 3 are also connected in series with the release magnets 2 across the train wires 9 and 10, so that said emergency magnets are energized to prevent an emergency application of the brakes.

The brakes may be held applied by turning the brake switch to lap position, in which the connection between the train wire 10 and the generator is opened, so that the circuit through the service magnets is opened to prevent a further application of the brakes, while the emergency magnets are maintained energized by the circuit through the train wires 8 and 9 and the winding controlled by commutator 7, which is closed through the contact 16 of the brake switch. The release magnets 2 are also energized by the circuit established through the winding controlled by the commutator 7, but since with the system employed the triple valve device has cut off the exhaust from the brake cylinder, it is immaterial in this position whether the release magnet is opened or closed.

In order to release the brakes, the brake switch is turned to running position, in which all circuits are open, except the circuit for energizing the emergency magnets 3, and the release magnets being deenergized, the brakes are released.

In the recharging position, the electric connections are the same as in lap position, but in this position as in the above mentioned patent fluid is supplied to the brake pipe for the purpose of recharging the system without releasing the brakes.

In emergency position, all circuits are opened, including the emergency circuit, so that the emergency magnets 3 are deenergized to effect an emergency application of the brakes.

Emergency action may also be effected upon a sudden reduction in pressure in the brake pipe 5 of the fluid pressure brake system by the operation of the emergency switch device 4. In this case the piston 18 is operated by spring 19 upon a reduction in pressure in the brake pipe 5, to close the switch 20 and thus short-circuit the train wires 8 and 9. This causes an excessive current flow through the overload switch 15, which then operates in the usual way to open the circuit at the train wire 9. The emergency magnets are then deenergized to cause an emergency application of the brakes.

I also propose to utilize the same train wires for signaling purposes, so that the operator on the head car or locomotive may signal to the rear car, or a signal may be made from the rear car to the operator on the head car.

For this purpose, I employ alternating current which is preferably obtained from the generator which is employed for supplying current for braking purposes. The armature shaft of the generator is provided with slip rings 21 in addition to the direct current commutators 6 and 7 and one brush of the slip rings is connected to the train wire 8 while the other brush is connected through a condenser 22 with train wire 9 and also through a condenser 23 with train wire 10.

A switch 24 controls the circuit through train wire 9 and a signal device 25 is interposed in the connection to train wire 10.

On the rear car or on any car of the train, a condenser 26 and switch 27 are interposed across the train wires 8 and 10 and a condenser 28 and a signal device 29 are interposed across the train wires 8 and 9.

If the operator on the head car wishes to signal to a car at the rear, he closes the switch 24, so that alternating current is supplied through the condenser 22 to train wire 9 and thence flows through the signal device 29 and condenser 28 to train wire 8 and back to the slip rings 21, thus closing a circuit through the signal device 29 for operating same.

If it is desired to signal the operator at the head end from the rear, the switch 27 is closed, and a circuit is closed from the condenser 26 through train wire 10 to signal device 25, through condenser 23 to the slip rings 21 and thence through train wire 8 to the switch 27. The signal device 25 is then operated to signal the operator on the head car.

Condensers are included in the various signal circuits at the points shown, so as to prevent the flow of direct current from the brake circuits to the signal devices.

Having now described my invention, what I claim as new, and desire to secure by Letters Patent, is:—

1. In an electrically controlled brake, the combination with a release magnet, a service application magnet, and an emergency application magnet, of three train wires having the release magnet connected across the first and second train wires, the emergency magnet across the second and third train wires, and the service magnet across the first and third and means for supplying current at one voltage across the first and third train wires and at a less voltage across the first and second and the second and third train wires.

2. In an electrically controlled brake, the combination with a release magnet, a service application magnet, and an emergency application magnet, of three train wires having the release magnet connected across the first and second train wires, the emergency magnet across the second and third train wires, and the service magnet across the first and third and a double voltage generator adapted to impress one voltage across the first and third train wires, another voltage across the first and second train wires, and the last-mentioned voltage across the second and third train wires.

3. In an electrically controlled brake, the combination with a magnet adapted upon deenergization to effect an emergency application of the brakes, of two normally energized train wires across which said magnet is connected, a normally open switch connected across said train wires, means operated upon applying the brakes for closing said switch, and means operated upon closing said switch for opening the circuit through the emergency magnet.

4. In an electro-pneumatic brake, the combination with electrically controlled means operated upon deenergization to effect an application of the brakes, of a normally energized train wire connected to said means, a normally open switch in circuit with said train wire, means operated upon applying the brakes for closing said switch, and means operated upon closing said switch for deenergizing said train wire.

5. In an electro-pneumatic brake, the combination with electrically controlled means operated upon deenergization to effect an application of the brakes, of a normally energized train wire connected to said means, a normally open switch in circuit with said train wire, means operated upon a reduction in brake pipe pressure for closing said switch, and means operating upon closing said switch for deenergizing said train wire.

6. In an electrically controlled brake, the combination with a normally energized train wire, the deenergization of which is adapted to effect an application of the brakes, of means operated upon applying the brakes for short-circuiting said train wire, and means operated upon short-circuiting said train wire for deenergizing the train wire.

7. The combination with an electrically controlled brake including magnets for controlling the brakes, train wires connected to said magnets, and means for supplying direct current to said train wires, of signal devices also connected to said train wires and means for supplying alternating current to said signal devices.

8. The combination with an electrically controlled brake including magnets for controlling the brakes, train wires connected to said magnets, and means for supplying direct current to said train wires, of signal devices also connected to said train wires, means for supplying alternating current to said signal devices, and condensers for preventing the flow of direct current from said train wires to the signal devices.

9. The combination with an electrically controlled brake device and an electrically controlled signal device adapted to be supplied with current through a common circuit, of means for rendering one device responsive only to alternating current and the other device only to direct current.

10. The combination with an electrically controlled brake device and an electrically controlled signal device adapted to be supplied with current through a common circuit, one device being responsive only to direct current, of means for rendering the other device responsive only to alternating current.

11. The combination with an electrically controlled brake device responsive only to direct current and an electrically controlled signal device responsive to alternating current, both devices being connected to a common current supply wire, of means for preventing flow of direct current to the signal device.

In testimony whereof I have hereunto set my hand.

JOHN B. GROSSWEGE.